United States Patent

Wang et al.

[11] Patent Number: 5,837,211
[45] Date of Patent: Nov. 17, 1998

[54] COMPOSITIONS AND METHOD FOR FOAM CONTROL IN BAYER PROCESS

[75] Inventors: Samuel S. Wang, Cheshire, Conn.; Dennis G. Downing, Brewster, N.Y.; Peter V. Avotins, Easton, Conn.

[73] Assignee: Cytec Technology Corp., Wilmington, Del.

[21] Appl. No.: 852,367

[22] Filed: May 7, 1997

Related U.S. Application Data

[63] Continuation of Ser. No. 556,527, Nov. 13, 1995, abandoned.

[51] Int. Cl.⁶ .......................... B01J 19/00; B01D 17/00; C01F 7/00
[52] U.S. Cl. .......................... 423/121; 423/130; 252/358; 252/321; 23/293 R; 23/305 A
[58] Field of Search ...................... 423/121, 130; 252/358, 321; 23/293 R, 305 A

[56] References Cited

FOREIGN PATENT DOCUMENTS

A-2161864  7/1973  France .

*Primary Examiner*—Steven Bos
*Attorney, Agent, or Firm*—Margaret M. Coyne; Joseph J. Mallon; Claire M. Schultz

[57] ABSTRACT

Methods of reducing foam in Bayer process liquor are provided, said methods comprising adding a composition to the Bayer process liquor that comprises a tri(alkoxy alkyl) phosphate and a hydroxyl group containing carrier.

8 Claims, No Drawings

COMPOSITIONS AND METHOD FOR FOAM CONTROL IN BAYER PROCESS

This is a continuation of application Ser. No. 08/556,527, filed on Nov. 13, 1995, now abandoned.

BACKGROUND OF THE INVENTION

1. Field of the Invention

The present invention is directed to improving the Bayer process and, more particularly, to reducing the foam formed in the liquor of the Bayer process.

2. Description of Prior Art

In the Bayer process for the production of alumina, bauxite ore is ground, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate is precipitated out of the solution and collected as product.

In more detail, the ground bauxite ore is fed to a slurry mixer where a water slurry is prepared. The slurry makeup water is typically spent liquor (described below) and added caustic. This bauxite ore slurry is then diluted and passed through a digester or a series of digesters where, under high pressure and temperature, about 98% of the total available alumina is released from the ore as caustic-soluble sodium aluminate. After digestion, the slurry then passes through several flash or blow-off tanks wherein the pressure of the digested slurry is reduced from several atmospheres to one atmosphere and the temperature of the slurry is reduced from about 400° F. to about 220° F.

The aluminate liquor leaving the flashing or blow-off operation contains from about 1 to about 20 weight percent solids, which solids consist of the insoluble residue that remains after, or is precipitated during, digestion. The coarser solid particles are usually removed from the aluminate liquor with a "sand trap" cyclone. The finer solid particles are generally separated from the liquor first by settling and then by filtration, if necessary. Any Bayer process slurry taken from the digesters through any subsequent dilution of the slurry, including the flash or blow-off tanks, but before the primary settler, is referred hereinafter as the primary settler feed. The slurry of aluminate liquor leaving the flash or blow-off tanks is diluted by a stream of recycled wash overflow liquor.

Normally, the primary settler feed is thereafter fed to the center well of the primary settler, where it is treated with a flocculant. As the mud settles, clarified sodium aluminate solution, referred to as "green" or "pregnannt" liquor, overflows a well at the top of the primary settler and is collected. This overflow from the primary settling tank is passed to the subsequent process steps. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic soda.

Bayer liquor has a tendency to foam due to its organic content. The foaming of the liquor is aggravated by mechanical agitation, by airsparging, and/or by transfer of the liquor from one vessel to the next. Foaming usually occurs after separation of the red mud, and before and during the precipitation of alumina trihydrate; however, it can also develop in transfer points and, generally, at any point after the digestion step where the pressure of the digested slurry is reduced to 1 atmosphere. Foaming is especially a problem after separation of the red mud, as mentioned above.

The foam poses a safety hazard in that the overflow of foam on vessel surfaces is a hazard to process workers since the foam is extremely caustic. The workers can suffer chemical burns upon contact with the foam and, therefore, it is critical to eliminate or reduce the foam so as to insure employee safety, a very important consideration for both the employee and the process operator.

Foam also complicates the heat control of the process. Because a vessel surface covered with foam serves as an insulator which retards heat loss, thermal control of the process becomes more difficult. This is especially important because processors strive to reduce the liquor temperature during precipitation in order to maximize yield of the product alumina trihydrate.

Vessels filled with large amounts of foam cannot be filled with the maximum quantity of liquor without foam overflow. It is important to fill the vessel as completely as possible with liquor in order to maximize product yield and process efficiency. In light of the above safety, engineering and economic problems caused by Bayer process foam, the amelioratation of the problem of foaming is a prime concern.

A variety of treatment procedures have been employed in the past, including the addition of alcohols, glycols, silicon compounds, hydrophobic silica, wax emulsions, amines; organosilicones; camphor oil; ketones; dibutylphthalate; alkylene glycols of high and low molecular weight; ethylene oxide derivatives; tri(butoxyethyl) phosphate, and fatty acid and/or alcohol-based additives to the foam containing Bayer process streams, see U.S. Pat. Nos. 5,275,628 and 5,346,511; Safonova et al, Obogashch. Rud (Leningrad), 28, (6), 25–27, 1983; Australian Patent No. 634,504. Many of the above chemical treatments do not work in all Bayer process liquors. Of the treatments that do work, many are not persistent antifoam/defoamers, in that the activity diminishes as the treatment chemical moves through consecutive precipitation vessels.

The cost of the above chemical treatments is also high. In a competitive economic climate, a defoamer/antifoam composition having a reduced cost would provide a great economic benefit.

Several of the prior art antifoam/defoamer treatments are also malodorous, volatile or hazardous to workers in Bayer process facilities and, therefore, antifoam/defoaming treatments which are more worker friendly and environmentally benign are constantly being sought.

Several of the antifoam/defoamer compositions listed above, such as the fatty acid based materials, also adversely affect crystal size distribution. Some antifoam/defoamer compositions such as silica or silicone introduce an undesirable impurity into the Bayer liquor which can reduce the purity, quality and salability of the product alumina trihydrate. Accordingly, the replacement of these antifoam/defoaming treatments with a different treatment which does not negatively impact the overall control of the process is a prime consideration.

In light of the difficulties posed by the foaming problem in Bayer process liquors and the inadequate antifoam/defoaming treatments currently available, it would be advantageous to provide an antifoam/defoamer composition which prevents or ameliorates Bayer process form without the problems caused by currently available antifoam/defoamer treatments.

SUMMARY OF THE INVENTION

One aspect of the invention provides a method for defoaming Bayer process liquors. According to the invention, Bayer process liquor is treated with an effective amount of an antifoam/defoamer composition comprising a composition comprising a tri(alkoxyalkyl) phosphate and a hydroxyl group containing carrier. Preferably, the antifoam/defoamer composition of the invention is added in an effective amount of from about 1 to about 200 parts per million (ppm) or, more preferably, in an effective amount of from about 1 to about 50 ppm. The present invention inhibits the formation of foam in Bayer process liquors. For a variety of reasons, this results in a significant cost savings in the production of alumina trihydrate.

DESCRIPTION OF THE PREFERRED EMBODIMENTS

The present invention provides a method for defoaming Bayer process liquor which uses an antifoam/defoamer/ composition comprising a tri(alkoxyalkyl) phosphate and a hydroxyl group containing carrier.

It has been surprisingly discovered that the compositions of the invention are extremely effective antifoams and defoamers.

Suitable trialkoxyalkyl phosphates useful in the antifoam/defoamer compositions include those having alkoxy and alkyl groups of 1–8 carbon atoms, inclusive. Preferably the alkoxy groups have at least 4 carbon atoms. Suitable phosphates include tri(methoxy octyl) phosphate; tri(ethoxy ethyl) phosphate; tri(butoxy ethyl) phosphate; tri(octyloxy methyl) phosphate, and the like.

Useful hydroxyl group containing carriers include the polyalkylene glycols, i.e., polyethylene or polypropylene glycol; distilled and/or oxo-alcohol bottoms; 2-ethylhexanol; glycol bottoms such as those sold by KMCO, Inc., of Houston, Tex., and the like. Preferred hydroxyl group containing carriers are oxo alcohol bottoms; 2-ethylhexanol; glycol bottoms and polyethylene and/or polypropylene glycols of molecular weights below about 600 daltons. The water-soluble polyalkylene glycols having an average molecular weight of from about 100 to about 600 daltons are effective carriers and those from about 150 to about 500 daltons are preferred.

According to the invention, the antifoam/defoamer composition is added to the Bayer liquor immediately after digestion, and immediately prior to, during and after the steps of red mud separation, crystallization, and filtration of the product alumina trihydrate. More preferably, the antifoam/defoamer composition is added to the Bayer liquor after red mud separation and prior to the crystallization of the alumina trihydrate.

The antifoam/defoamer composition is preferably added to the Bayer liquor in a concentration of from about 1 to about 200 parts per million (ppm), and, more preferably, in a concentration of from about 1 to about 100 ppm. Most preferably, however, the antifoam/defoamer composition is added to the Bayer liquor in a concentration of from about 1 to about 50 ppm.

Other materials may be added to the antifoam/defoamer compositions hereof such as silicone surfactants, petroleum oils, crystal modifiers, etc., without departing from the scope of the present invention.

The following examples are set forth for purposes of illustration only and are not to be construed as limitations on the present invention except as set forth in the appended claims. All parts are by weight unless otherwise specified.

The test results shown below are achieved as follows: 300 ml. of Bayer Process liquor is charged to a 1 liter cylinder and maintained at 85° C. An air sparge is placed into the bottom of the cylinder and air is fed therethrough at 0.5 liter/minute so as to create a foam. After a short period, an equilibrated foam height is established, recorded and referred to as the initial foam height. The air is turned off allowing the foam to collapse and then the antifoamer/defoamer composition is added at from 5–50 ppm. The air is again fed into the liquor at the same rate, the foam height is then observed and recorded as a function of time. Over a 50% reduction in foam height by the composition is considered to be acceptable for plant usage.

EXAMPLE 1

A series of runs is conducted using a variable ratio of tri(butoxy ethyl) phosphate (TBEP) to KMCO, Inc., polyglycol bottoms (PGB) and each ingredient alone at 10 ppm. The results are set forth in Table I, below.

TABLE I

| Time (min.) | TBEP 100/0 | 70/30 | 70/30 | 50/50 | 50/50 | 30/70 | 30/70 | 30/70 | PGB |
|---|---|---|---|---|---|---|---|---|---|
| | | | Foam Height (mL) | | | | | | |
| Initial | 620 | 610 | 640 | 620 | 650 | 620 | 650 | 650 | 610 |
| 1 | 340 | 350 | 360 | 360 | 360 | 350 | 340 | 360 | 400 |
| 5 | 340 | 410 | 420 | 420 | 410 | 370 | 390 | 410 | 460 |
| 30 | 400 | 460 | 480 | 480 | 460 | 420 | 420 | 410 | 480 |
| | | | Percent of Original Foam | | | | | | |
| 1 | 10 | 13 | 15 | 16 | 15 | 13 | 9 | 15 | 30 |
| 5 | 10 | 33 | 33 | 35 | 29 | 19 | 24 | 29 | 50 |
| 30 | 29 | 50 | 52 | 55 | 44 | 35 | 32 | 29 | 57 |

Although the compositions of the trialkoxy alkyl phosphate and the hydroxyl group containing carrier may contain a ratio of said ingredients ranging from about 9:1 to about 1:9, respectively, it is preferred that the ratio range from about 4:1 to about 1:4, respectively. Most preferably it has been found that a ratio of from about 1:9 to about 2:3, respectively, is most effective and, in fact, provides an unexpected synergistic result.

It can be seen that the components of the 30/70 composition act synergistically since the Foam Height achieved using the composition approaches that of the 100% TBEP component whereas the 50/50 and 70/30 compositions are less effective.

EXAMPLE 2

When a composition composed of 20% (tri(butoxyethyl) phosphate (TBEP) and 80% of distilled alcohol bottoms (DAB) is employed as in Example 1, the following results are achieved, see Table II.

TABLE II

| Time (min.) | TBEP | 20 TBEP/80 DAB |
|---|---|---|
| Foam Height (mL) | | |
| 1 | 360 | 400 |
| 5 | 360 | 470 |
| 20 | 370 | 500 |
| 30 | 450 | 510 |
| Percent of Original Foam | | |
| 1 | 13 | 21 |
| 5 | 13 | 37 |
| 20 | 16 | 44 |
| 30 | 33 | 47 |

EXAMPLE 3

Example 2 is again followed except that the DAB is replaced by 2-ethylhexanol (2EH) the results are shown in Table III, below.

TABLE III

| Time (min.) | TBEP | 80 TBEP/20 2EH |
|---|---|---|
| Foam Height (mL) | | |
| 1 | 360 | 410 |
| 5 | 360 | 450 |
| 20 | 370 | 480 |
| 30 | 450 | 490 |
| Percent of Original Foam | | |
| 1 | 13 | 28 |
| 5 | 13 | 39 |
| 20 | 16 | 47 |
| 30 | 33 | 50 |

EXAMPLE 4

The procedure of Example 2 is again followed except that the DAB is replaced by polypropylene glycol having an average molecular weight of about 425 daltons. Again, excellent foam height reduction is achieved.

EXAMPLE 5

The procedure of Example 4 is repeated except that the polypropylene glycol has an average molecular weight of about 400 daltons. Similar results are achieved.

We claim:

1. A method for reducing foam in a Bayer process liquor comprising adding to said liquor from about 1 to about 200 parts per million of a composition comprising a tri(alkoxy alkyl) phosphate and a hydroxyl group containing carrier, wherein the ratio of said phosphate to said carrier ranges from about 1:9 parts by weight to about 2:3 parts by weight.

2. The method of claim 1 wherein the phosphate is tri(butoxyethyl) phosphate.

3. The method of claim 2 wherein the carrier is polyglycol bottoms.

4. The method of claim 2 wherein the carrier is a polyalkylene glycol of less than about 600 average molecular weight.

5. The method of claim 4 wherein the glycol is polypropylene glycol.

6. The method of claim 1 wherein the composition is added to the liquor after red mud separation and prior to crystallization of alumina trihydrate.

7. The method of claim 2 wherein the carrier is 2-ethylhexanol.

8. The method of claim 2 wherein the carrier is distilled alcohol bottoms.

* * * * *